(12) United States Patent
Robkin

(10) Patent No.: US 6,629,510 B1
(45) Date of Patent: Oct. 7, 2003

(54) RANDOMLY MOVING PET AMUSEMENT DEVICE WITH FLEXIBLE ATTACHMENT

(76) Inventor: Michael B. Robkin, 1244 Sinaloa, Pasadena, CA (US) 91101

( * ) Notice: Subject to any disclaimer, the term of this patent is extended or adjusted under 35 U.S.C. 154(b) by 0 days.

(21) Appl. No.: 09/542,144

(22) Filed: Apr. 4, 2000

Related U.S. Application Data

(60) Provisional application No. 60/127,983, filed on Apr. 6, 1999.

(51) Int. Cl.[7] ................................................ A01K 29/00
(52) U.S. Cl. ...................... 119/707; 119/708; 119/711; 446/437
(58) Field of Search ................................. 119/702, 707, 119/708, 709, 710, 711; 446/3, 396, 437

(56) References Cited

U.S. PATENT DOCUMENTS

| | | | | |
|---|---|---|---|---|
| 3,722,134 A | * | 3/1973 | Merrill et al. ............... | 446/462 |
| 3,727,583 A | * | 4/1973 | Muraro ....................... | 119/711 |
| 4,708,690 A | | 11/1987 | Kulesza et al. ............. | 446/351 |
| 4,884,807 A | * | 12/1989 | Welch ......................... | 473/575 |
| 4,930,448 A | * | 6/1990 | Robinson ................... | 119/708 |
| 5,111,771 A | * | 5/1992 | Mathews .................... | 119/708 |
| 5,147,219 A | * | 9/1992 | Gilberts et al. ............. | 439/521 |
| 5,148,769 A | * | 9/1992 | Zelinger ..................... | 119/708 |
| 5,297,981 A | * | 3/1994 | Maxim et al. .............. | 446/437 |
| 5,595,141 A | * | 1/1997 | Udelle et al. ............... | 119/706 |
| 5,924,387 A | * | 7/1999 | Schramer .................... | 119/708 |
| 5,924,909 A | | 7/1999 | Yamakawa .................. | 446/442 |
| 5,934,968 A | | 8/1999 | Lin ............................. | 446/358 |
| 5,964,639 A | | 10/1999 | Maxim ....................... | 446/437 |
| 5,993,286 A | | 11/1999 | Tacquard et al. ........... | 446/351 |
| 6,066,026 A | * | 5/2000 | Bart et al. ................... | 180/6.2 |
| 6,129,606 A | | 10/2000 | Yuen .......................... | 446/325 |
| 6,155,905 A | * | 12/2000 | Truax ......................... | 446/330 |
| 6,158,390 A | * | 12/2000 | Holtier et al. .............. | 119/707 |

* cited by examiner

*Primary Examiner*—Charles T. Jordan
*Assistant Examiner*—John W. Zerr
(74) *Attorney, Agent, or Firm*—Christie, Parker & Hale, LLP

(57) ABSTRACT

A cat toy comprising a randomly moving body and one or more attached members. The pseudo-random mechanical motion of the body is transmitted by the member to a free end of the member. Angular momentum tends to keep the free end of the member moving near the ground thus creating a moving object attractive to cats and inducing them to play and exercise.

10 Claims, 12 Drawing Sheets

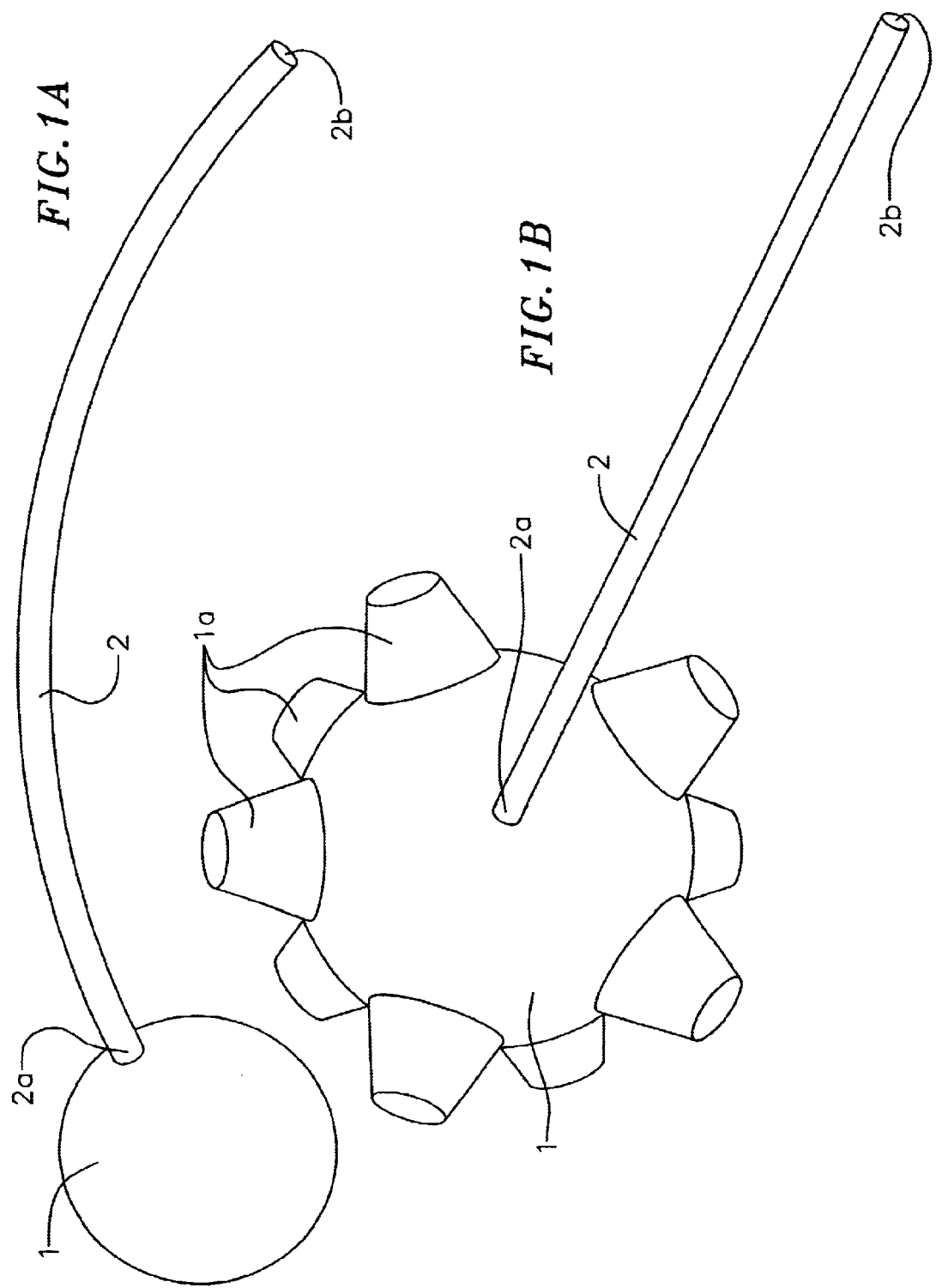

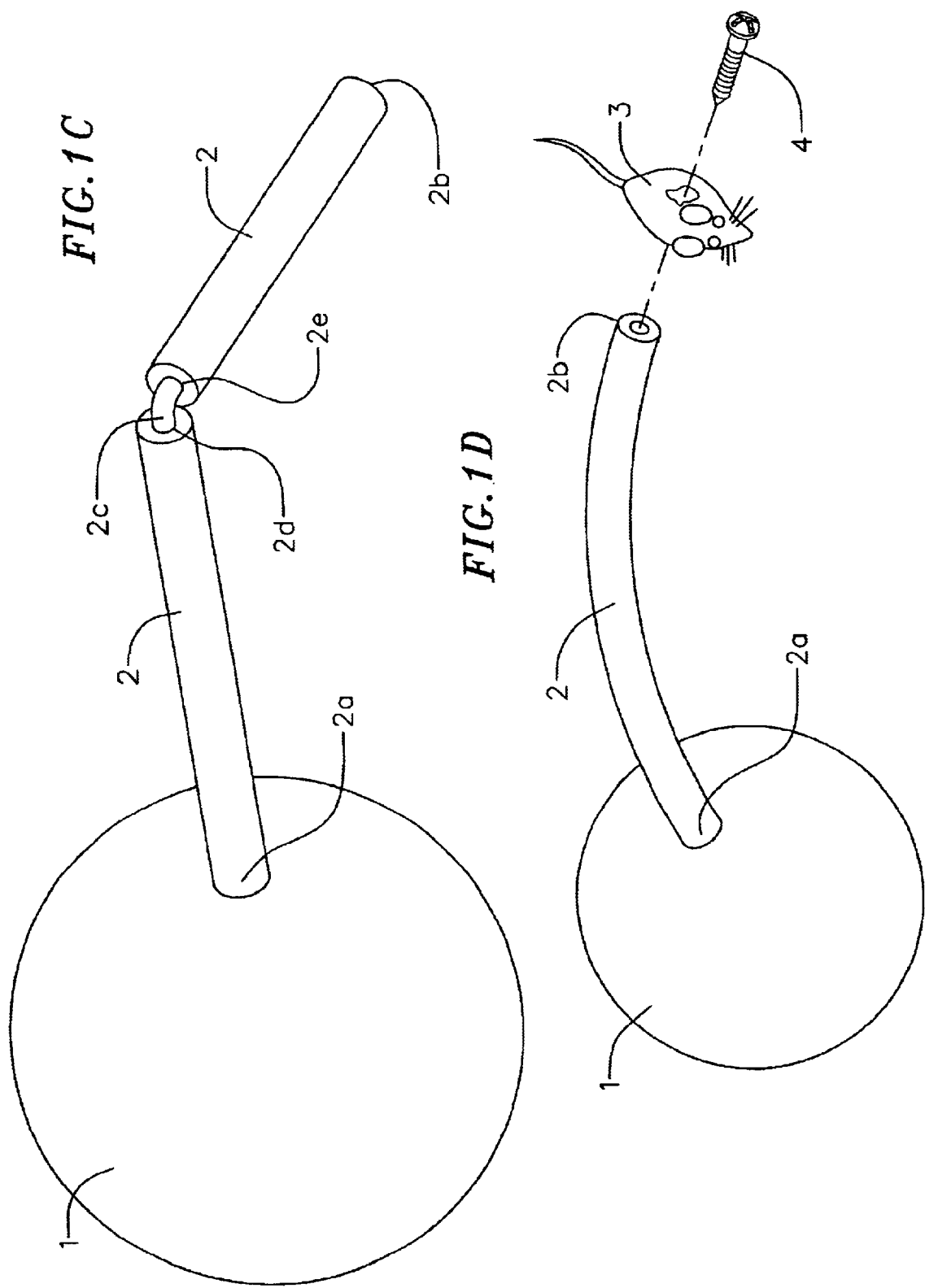

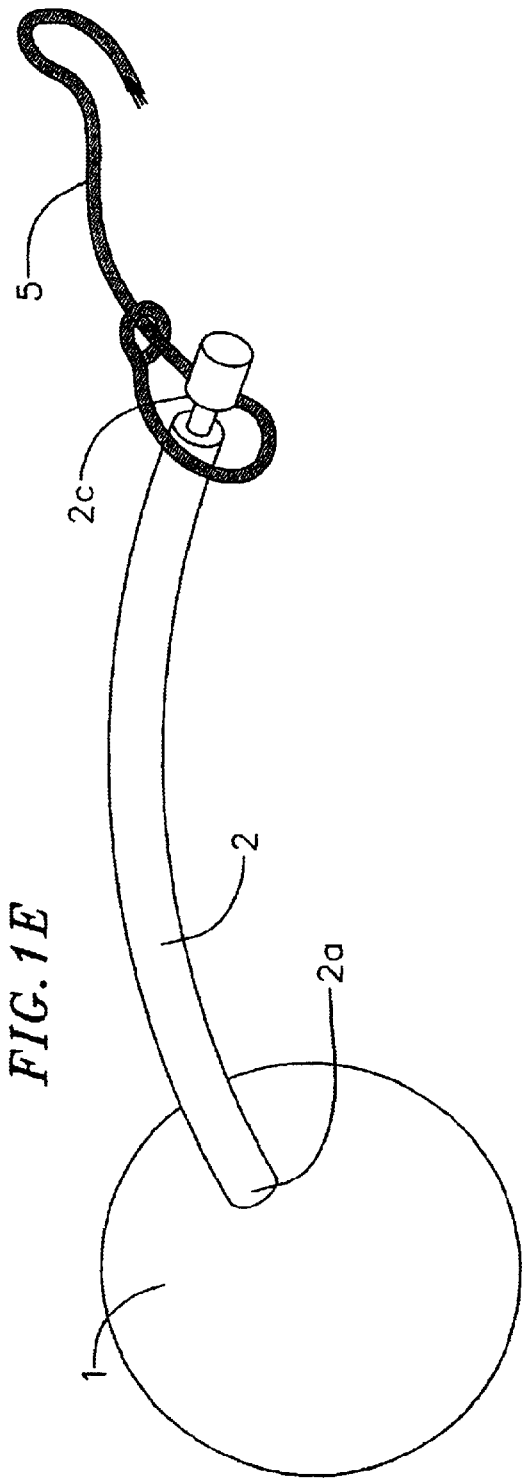
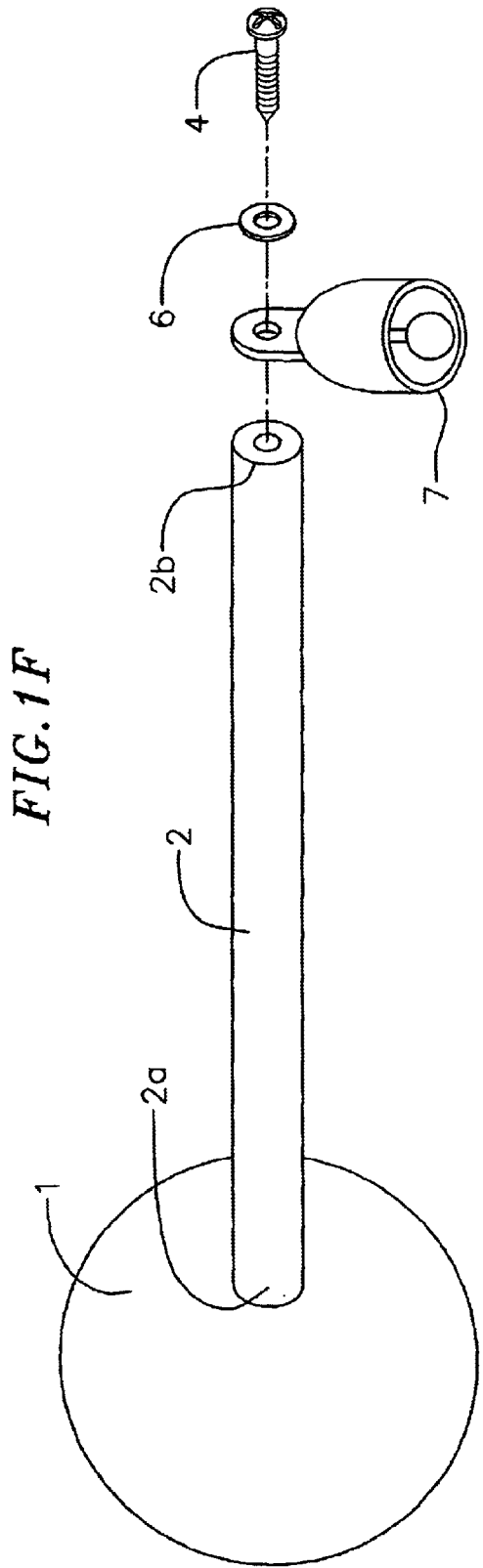

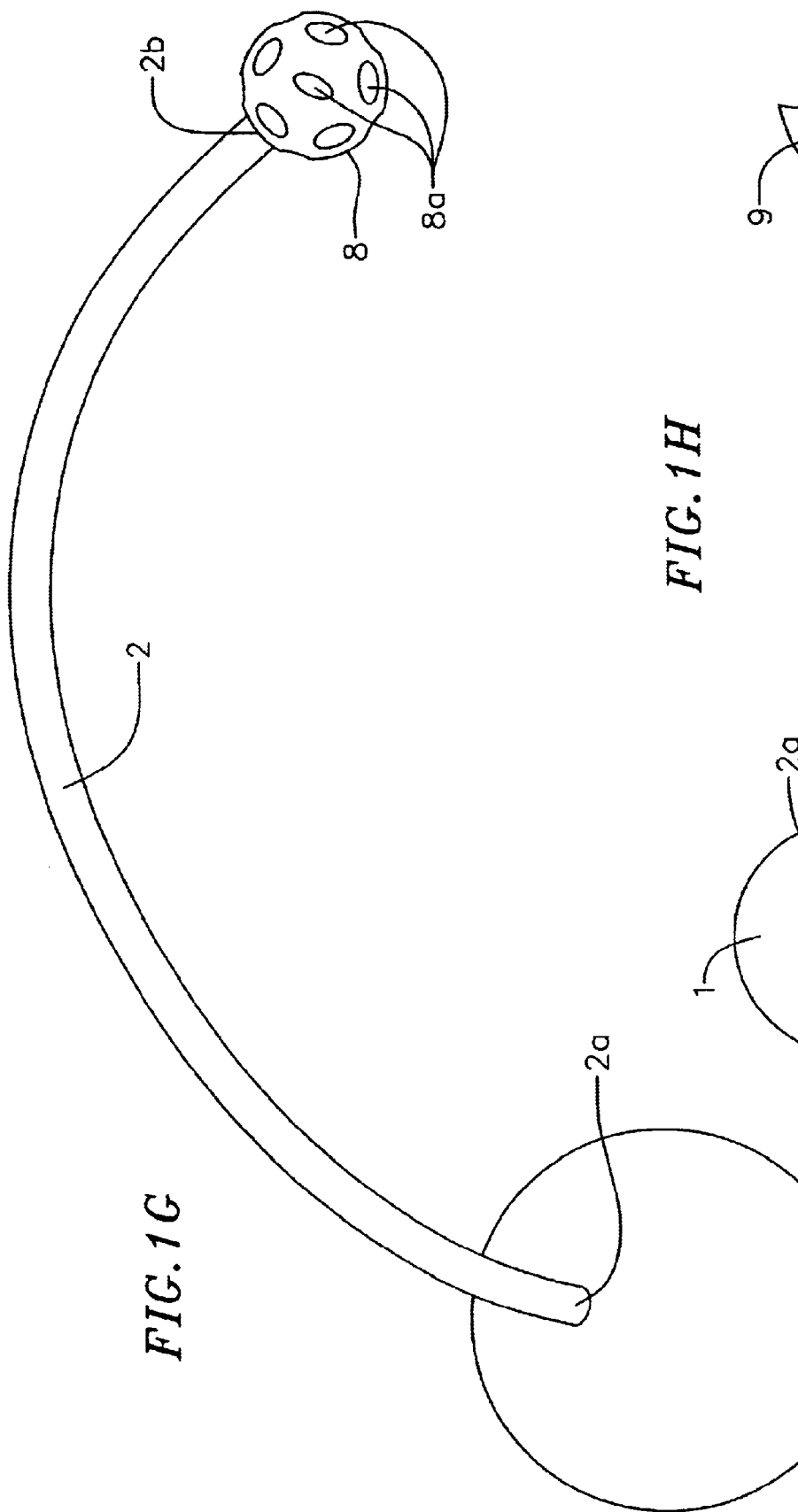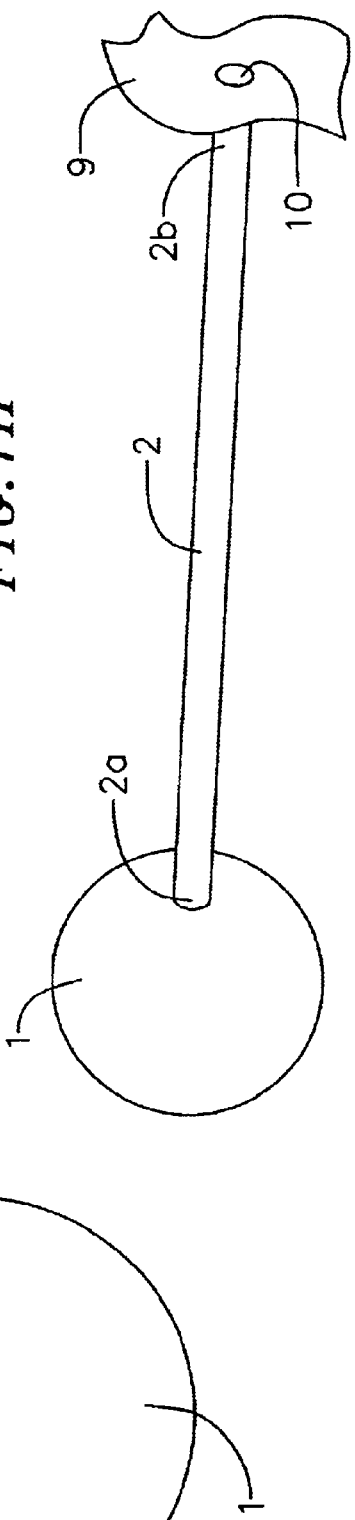

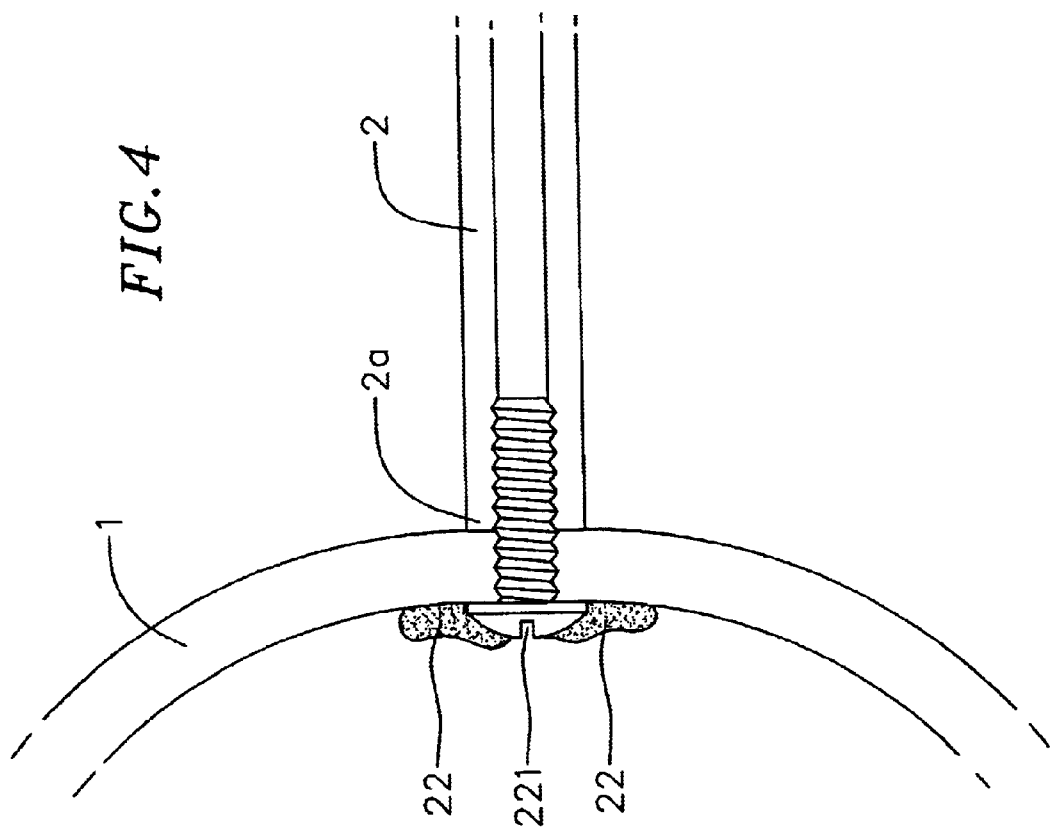
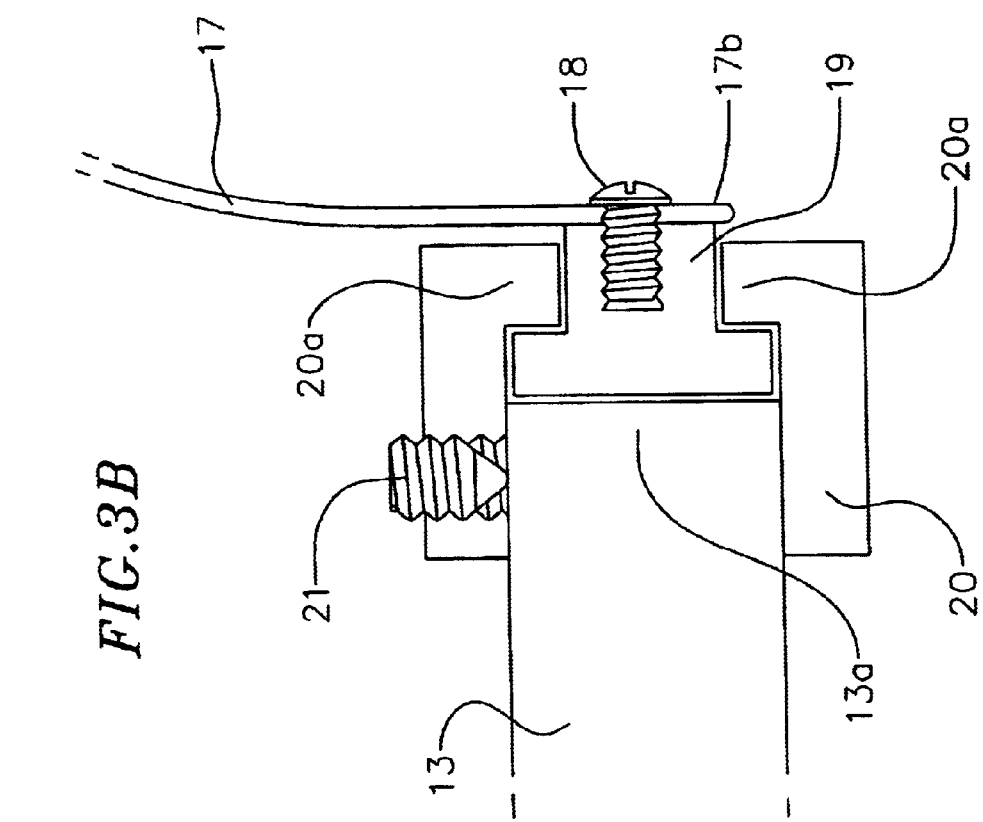

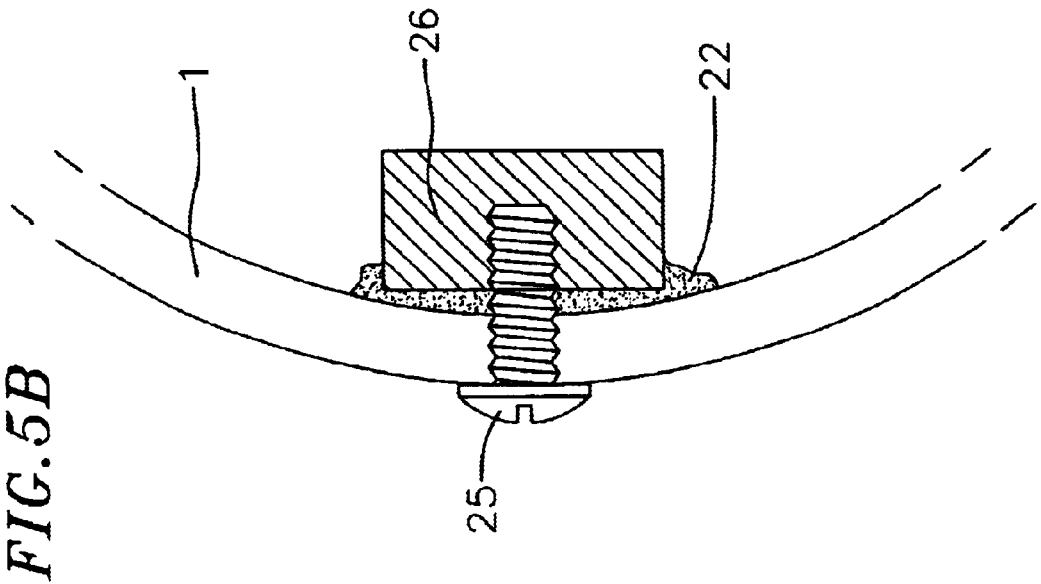
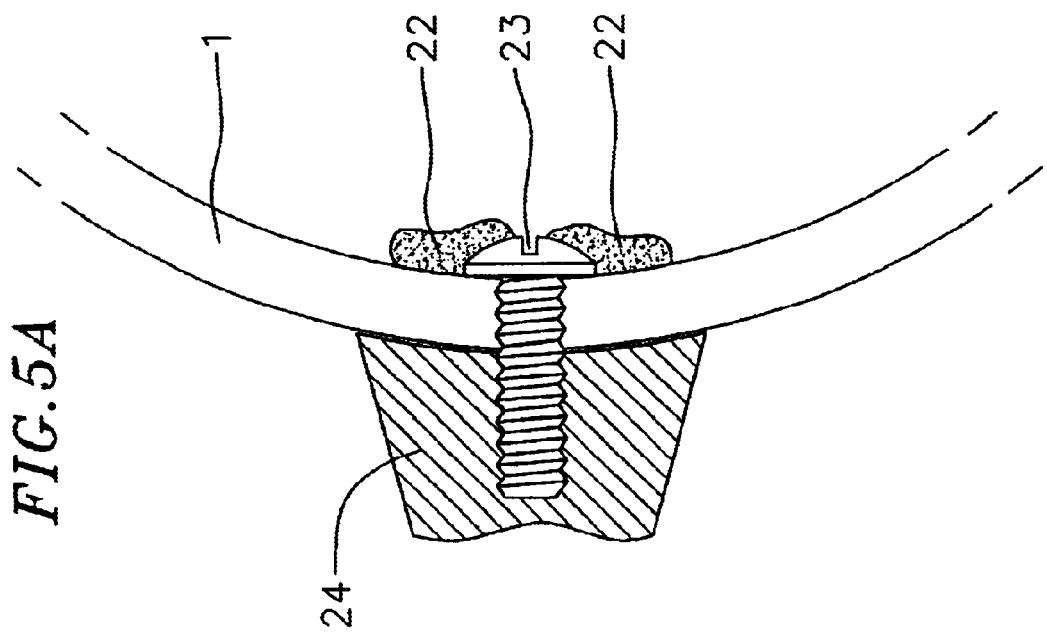

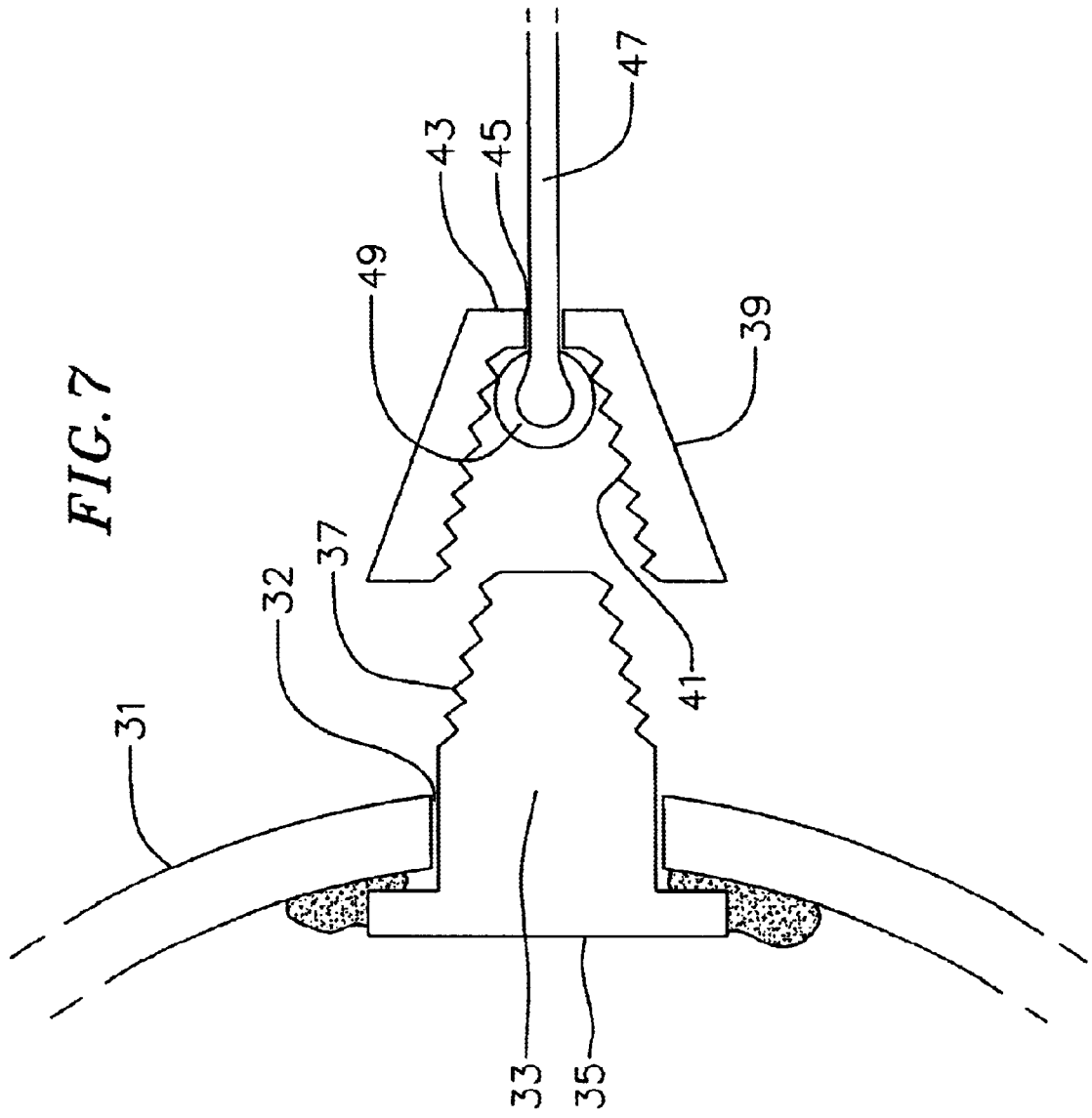

RANDOMLY MOVING PET AMUSEMENT DEVICE WITH FLEXIBLE ATTACHMENT

CROSS-REFERENCE TO RELATED APPLICATIONS

This application claims the benefit of the filing date of U.S. Provisional Application No. 60/127,983, filed Apr. 6, 1999, the disclosure of which is incorporated herein by reference.

BACKGROUND OF THE INVENTION

This invention relates generally to entertainment and exercise devices, and specifically relates to a toy for household pets, particularly cats.

Cats are a popular pet all over the world. There are over 55 million pet cats in the United States alone. Cats require regular exercise and stimulus to remain healthy. As cats are naturally hunters, in the wild cats obtain such exercise through their hunting activities. Unfortunately many pet cats are kept indoors where they have little opportunity to exercise naturally through hunting, and these pet cats receive little stimulus from an unchanging indoor environment. One way to provide indoor pet cats exercise and stimuli is to give them animals to hunt. Giving indoor cats animals to hunt, however, is not always a practical solution as it may result in a mess requiring cleaning. Also rodents, the likely choice of prey for cats, may be considered to be too unsanitary to be allowed loose inside of a home. This is particularly true as there is always a possibility that the rodent would evade the cat and end up infesting the home. Finally, some people may consider providing cats prey for hunting distasteful, and possibly even cruel and unethical.

Many cats live partly outdoors and thereby have an opportunity for exercise and stimulus. These cats, however, are exposed to numerous dangers. Pet cats that live in urbanized areas are exposed to dangers from severe weather, cars, machinery, environmental pollutants and poisons, and other domestic animals such as dogs. Pet cats that live in suburban or rural environments are additionally exposed to natural predators such as coyotes. All cats that live partly outdoors risk exposure to serious or fatal diseases from other animals, and exposure to nuisance parasites such fleas and ticks. Some of these parasites may be passed onto humans. Many of the common remedies for feline diseases and parasites are costly in terms of time and money.

A cat's natural hunting instincts can be sublimated into playing and exercising with small toys or strings. This is often unsatisfactory for the cat because they can get bored with inanimate objects. Having a human move or operate a toy or object can increase a cat's interest. But a human moving or operating a cat's toy is often unsatisfactory for both the human and the cat since some people do not have time to play with their cat, some people get tired moving an object around for their cats, and sometimes a person will get scratched or bitten by a cat in the course of playing with it.

Additionally, some people are allergic to cats and should avoid getting close to them or touching them. Indeed, pregnant women may be advised to avoid cats since their unborn child could contract the disease toxoplasmosis from a cat.

Additionally, some people enjoy watching their cats play regardless of any benefit to the animal. This fully automated cat toy provides entertainment in the form of a playing cat without trivial effort on the part of the person.

SUMMARY OF THE INVENTION

The present invention provides a method for stimulating and exercising cats, thus giving them healthier lives. The present invention provides this in an indoor setting, thus allowing owners to reduce or eliminate the amount of time their cats spend outdoors. This reduces the cats exposure to diseases and other dangers, and reduces the owner's exposure to parasites such as fleas and ticks.

The present invention provides a body, a means to propel the body in a series of varying pseudo-random directions, and one or more moment members that through their linear stiffness and angular moment translate the motion of the body into random motions of the end of the member. Such randomized motions of the member and the end of the members are useful for enticing exercise and play in cats and other animals. Such random motions of the member and the end of the members are more interesting to animals than repetitive non-random motions, thus serving to elicit more exercise over a longer period of time than a toy with repetitive motion.

The object moves randomly due to the contact of the surface of the object with another surface. Therefore the moment of inertia of the object for this description is assumed to be measured about the physical center of the surfaces of the object that contact the ground and other objects, and not the center of gravity of the object.

If the moment of inertia of the member when the member is stiff is not offset by an equal moment of inertia of a counterweight on the object opposite the member, then the random motion of the object will tend to be such that the end of the member tends to move towards the ground. If the counterweight has a moment of inertia significantly greater than the member, then the object will tend to randomly orient itself more often with the counterweight down. One embodiment of the present invention is with a counterweight approximately equal in moment of inertia to the member. In this embodiment the member during its random motions will always spend some time near the ground and some time pointed away from the ground. This phenomenon is explained by the "drunkard's walk" paradigm of random motion in one dimension. For purposes of explanation the one dimension applicable to this paradigm is the angle between the member and the ground. This embodiment creates a random motion where the member alternates between moving both quickly over the object, and then bouncing along the ground. This type of movement has been observed to be very enticing to cats.

The force of gravity tends to bend a flexible or semi-flexible member towards the ground. One embodiment of the present invention with a flexible member is where the member is of sufficient length and flexibility such that the distal end of the member remains just in contact with the ground when the object is oriented so that the member is perpendicular to the ground where it attached to the object and the object is not moving.

In one embodiment more than one member is attached. In another embodiment multiple members are of different length or manufacture. In some embodiments members are of varying dimension, with the members conveying mechanical motion from the body to the end of the member. In various embodiments the members are connected to the body at different spots on the body, and at varying angles. In another embodiment the members are jointed or hinged. In different embodiments the members may have multiple hinges, and in some embodiments are hinged or jointed where they attach to the object. In some embodiments toys, lures, and other objects are attached to the end of the member to provide further stimulus to the animal.

The members may be stiff and inflexible, partly flexible, or flexible. Parts of a member may be stiff while other sections may be flexible. More than one body may be used, with each body at the either end of a member. In some embodiments the members are branched, and in other embodiments members are connected to the body at more than one point.

The members are made of various materials such as wire, solid plastic, hollow plastic, inflated plastic, wood, ceramic, cardboard, or combinations thereof. Solid and hollow plastic is a preferred material because it is safer, inexpensive, non-toxic, and resists damage caused by the animal, does not conduct electricity and does not scratch household furniture.

A soft attachment at the end of the member reduces the possibility of the end of the member scratching or damaging furniture, an animal, or a person.

In one embodiment random motion is induced on the object internally by mounting a small motor capable of moving a small weight within the body. In another embodiment, the random motion is induced on the object externally by placing a body on a vibrating platform. The random motion may also be induced on the object externally by connecting the body with a spring or spring-like device to a device having a repetitive motion. The random motion may be induced on the object externally by placing the body in a container with other moving objects, thus creating random motion through Brownian motion.

In other embodiments the device is constructed with aural cues, such as beeping or chirping, generated by a device in the member or body. In yet other embodiments the device is constructed with odor cues, such as catnip, generated by a device in the member or body. In yet other embodiments the device is constructed with visual cues, such as string, feathers, common cat toys such as toy mice attached at the ends of one or more members. The device may also include scratchable substances, such as rope, cloth, or fur attached at the end of a member or even covering all or part of one or more members or some or all of the body. In other embodiments the device is constructed with chewable or biteable toys, or a chewable or biteable substance such as stuffed cloth attached at the end of a member. In other embodiments the device is constructed with a timer such that the device alternates between random motion and no movement.

Many of the attendant features of this invention will be more readily appreciated as the same becomes better understood by reference to the following detailed description considered in connection with the accompanying drawings.

BRIEF DESCRIPTION OF THE DRAWINGS

FIG. 1A is a perspective view of an embodiment cat toy of the present invention with internally generated random motion;

FIG. 1B is a perspective view of another embodiment of a cat toy of the present invention with a body with projections and a rigid member;

FIG. 1C is a perspective view of another embodiment of a cat toy of the present invention with a hinged member;

FIG. 1D is a perspective view of another embodiment of a cat toy of the present invention with a common visual cat toy at the end of a member;

FIG. 1E is a perspective view of another embodiment of a cat toy of the present invention with a string attached at the end of a member;

FIG. 1F is a perspective view of another embodiment of a cat toy of the present invention with a bell attached at the end of a member;

FIG. 1G is a perspective view of the cat toy of FIG. 1A with a catnip-scented toy attached at the end of a member;

FIG. 1H is a perspective view of another embodiment of a cat toy of the present invention with a cloth attached at the end of a member;

FIG. 3B is a sectional view of the attachment to the motion generator of FIG. 3A;

FIG. 4 is a sectional view of the cat toy of FIG. 1H showing the attachment of the member and object;

FIG. 5A is a cut-through detailed side view of an embodiment of a cat toy of the present invention with a counter-weight attached externally to the object;

FIG. 5B is a cut-through detailed side view of an embodiment of a cat toy of the present invention with a counter-weight attached internally to the object 1;

FIG. 7 illustrates a sectional side view of an attachment of a member to an object.

DETAILED DESCRIPTION

Figure 1I:
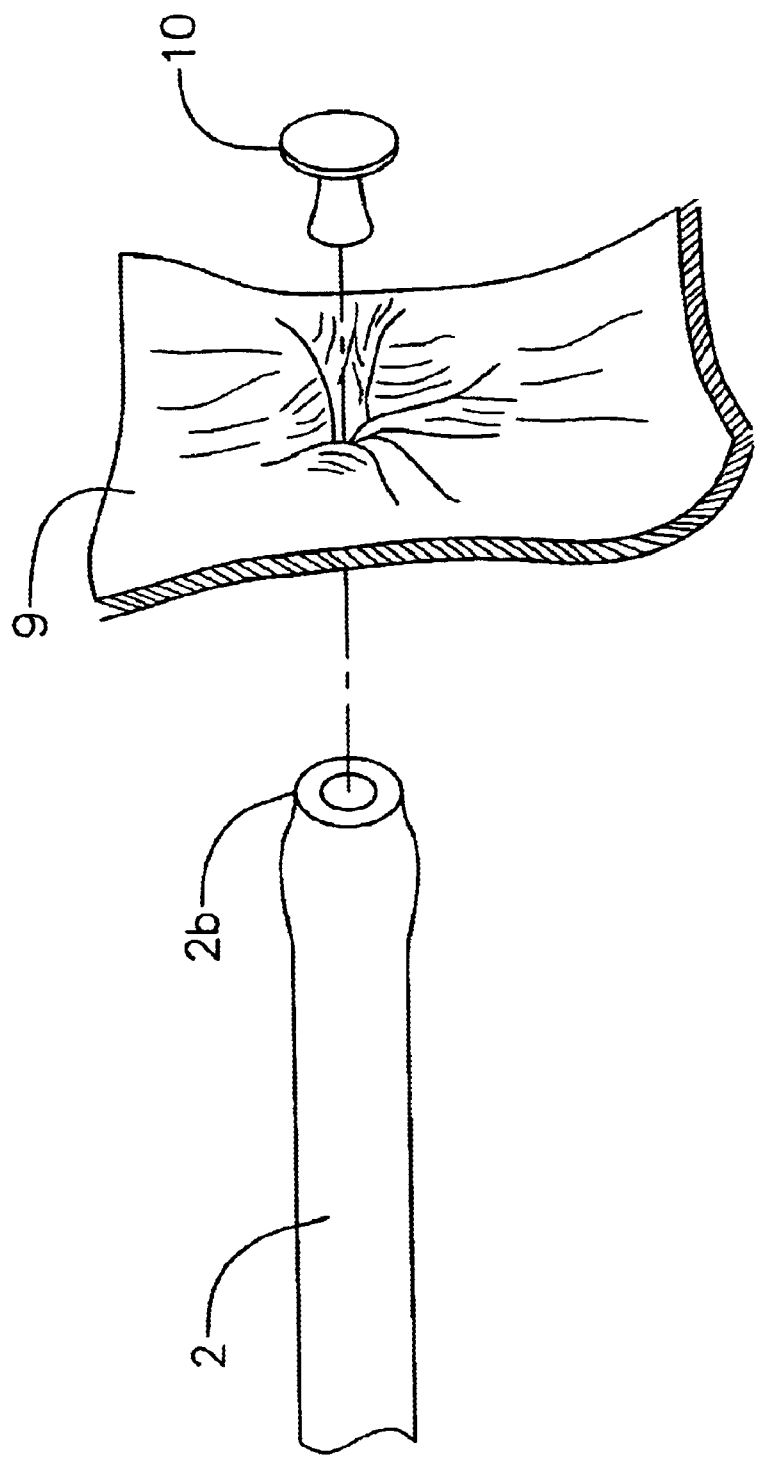
FIG. 1I is a detail blow-up view of the scratchable substance and free end of the member of FIG. 1H.

Referring now to the drawings, FIG. 1A illustrates a cat toy of the present invention. The cat toy includes a spherical body 1 which has a semi-rigid member 2, or attachment, extending from the body. The semi-rigid member is connected to the body at a connected end 2a. The member has a free end 2b at an opposing end of the member. Within the body is a small motor which, when energized, moves a small weight also within the body.

The movement of the small weight results in motion of the body. As the body moves, the member moves as well. As the member extends from the body, the movement of the body causes the free end of the member to move at varying speeds, heights and directions. This produces a type of movement which is naturally appealing to cats. The moving member is very attractive to cats and entices the cats to play and exercise by swatting and chasing the attachment. Moreover, this occurs without any intervention by the owner. Additionally since large moving bodies are sometimes repellent to cats, the dichotomy of an attractive and unattractive object provides more exercise and stimulus to a cat than an attractive object alone.

Bodies with moving masses therein are known, and may be, for example, an Ertl Toys' Bumble Ball described in U.S. Pat. No. 5,207,981, the disclosure of which is incorporated by reference, or a D.Y. Toy Weazel Ball. The member may be, for example, a CAT DANCER™ toy.

The end of the member is a distance away from the randomly moving body. Accordingly, the end of the member has an angular moment about the body. This angular moment tends to result in the end of the member moving along the ground or a short height above the ground due to the effect of gravity. Thus, varying the length, stiffness, flexibility, thickness, taper and density of the material comprising the member results in variation in the angular moment about the body. The ideal length of a member is such that the moving end of the member is separated from the object. This distance preferably should be at least twice the diameter of the object if the object has internally generated random motion (as in the embodiment of FIG. 1A through 1J).

A member that is stiff tends not become tangled with furniture or household objects. A limp member will often become wrapped around furniture or tangled with other objects. A long member is preferably for animals that are wary or frightened by the randomly moving object. However, the mass of a member must be small enough in comparison to the object's movement energy that some movement is noticeable by an animal at the distal end of the member. The mass of the member should be less than the mass of the object. Thus, in one embodiment, the member is ⅛ inch diameter DELRIN™, generally known as acetal, with a length of preferably 1.0 to 3.5 feet, more preferably 1.5 to about 3.0 feet, and even more preferably about 3 feet.

If a cat has a favorite toy it may be placed or attached by the owner at the end of a member, thus further interesting the animal. The body, the arm, or an attachment to the arm may be covered with any material commonly used in animal toys such as cloth, rope, string, fur, or rubber.

The entire device moves around the entire room or floor, thus providing more opportunity for the animal to exercise by running or jumping. The stiffness of the attachment prevents it from becoming tangled or locked up in household furniture or other obstructions. The movement of the end of the attachment is largely random, and not repetitive. The movement of the end of the attachment, depending upon the environment in which it is operating becomes hidden or moves behind objects in its random motion, further stimulating the animal.

The attractiveness of the device of FIG. 1A does not depend upon aural or odor cues. The device does not require intervention by a human other than to turn it on and off. The device does not require an action by the animal in order to start or maintain the device's function. The device does not require electronic sensors or complex control circuitry. Accordingly, the device provides a simple solution for providing exercise and entertainment for a cat.

FIG. 1B illustrates another cat toy of the present invention. In the embodiment illustrated in FIG. 1B the body has projections or knobs 1a. The knobs extend from the body and are substantially cylindrical in shape, although the diameter of the knobs decrease somewhat with distance from the body, thus providing a somewhat conical cross-section. When the body moves its motion is randomized due to the bouncing of the body on the ground or floor surface due to the projections.

FIG. 1C illustrates another cat toy of the present invention. In the embodiment of FIG. 1C, the body 1 has a semi-rigid member 2 having a hinge 2c extending from the body. The hinge 2c is made of strong flexible material such as cord which is inserted into a hollow member 2 at points 2d and 2e and held in place with glue. The hinge provides additional movement of the free end of the member, and provides varying resistance to the paw of the cat. This is because the force of the cat's paw may result in movement of the hinged end of the member or of the toy as a whole depending on the degree of bending in the hinge.

FIG. 1D illustrates another cat toy of the present invention. The cat toy of FIG. 1D is similar to the cat toy of FIG. 1A. The embodiment of FIG. 1D, however, additionally includes a stuffed cloth toy mouse 3 at the free end 2b of the member 2. Then held in place with a screw 4. Thus, the cat toy of FIG. 1D includes a visual cue, namely a cat lure, on the free end of the member. Accordingly, the embodiment of FIG. 1D provides the benefits of both a moving toy and the benefits of traditional inert cat lures. In some aspects, the cat lure is a chew toy in that cats may bite or chew the lure. Accordingly, in some embodiments the toy mouse is replaced by other chew toys, with chew toys having a taste, texture, and measure of compressability which makes them suitable for biting by cats.

FIG. 1E illustrates another embodiment of a cat toy of the present invention. The cat toy of FIG. 1E is similar to the cat toy of FIG. 1A. The embodiment of FIG. 1E, however, additionally includes a string 5 attached at the free end 2b of the member 2. The string is attached to the free end of the member by looping a portion of the string around a notched portion 2c of the member. In alternative embodiments the string is replaced by a cord or a rope.

FIG. 1F illustrates another embodiment of a cat toy of the present invention. The cat toy of FIG. 1F is similar to the cat toy of FIG. 1A. The embodiment of FIG. 1F, however, additionally includes a bell 7. The bell provides an aural cue to the cat. The bell is attached to the free end 2b of the member 2 with a screw 4 and washer 6.

FIG. 1G illustrates another embodiment of a cat toy of the present invention. The cat toy of FIG. 1G is similar to the cat toy of FIG. 1A. The cat toy of FIG. 1G, however, additionally includes a container 8 of catnip having small porous holes 8A attached at the free end 2b of the member 2.

FIG. 1H illustrates another embodiment of a cat toy of the present invention. The embodiment of FIG. 1H is similar to the embodiment of FIG. 1A. The embodiment of FIG. 1H, however, additionally includes a scratchable material 9 such as fur attached at the free end 2b of the member 2 with a rivet 10. In alternative embodiments the fur is replaced with cloth or rope. The use of scratchable material need not be limited to attachment at the end of the member. In one embodiment the member is substantially, and even completely, covered in scratchable material.

FIG. 1I illustrates a detail view of the cat toy illustrated in FIG. 1H. The member 2 is hollow. A scratchable substance 9, cloth as illustrated, is held in place at the distal end 2b of the member 2 through a rivet 10 inserted into the hollow member at 2b.

Figure 1J:
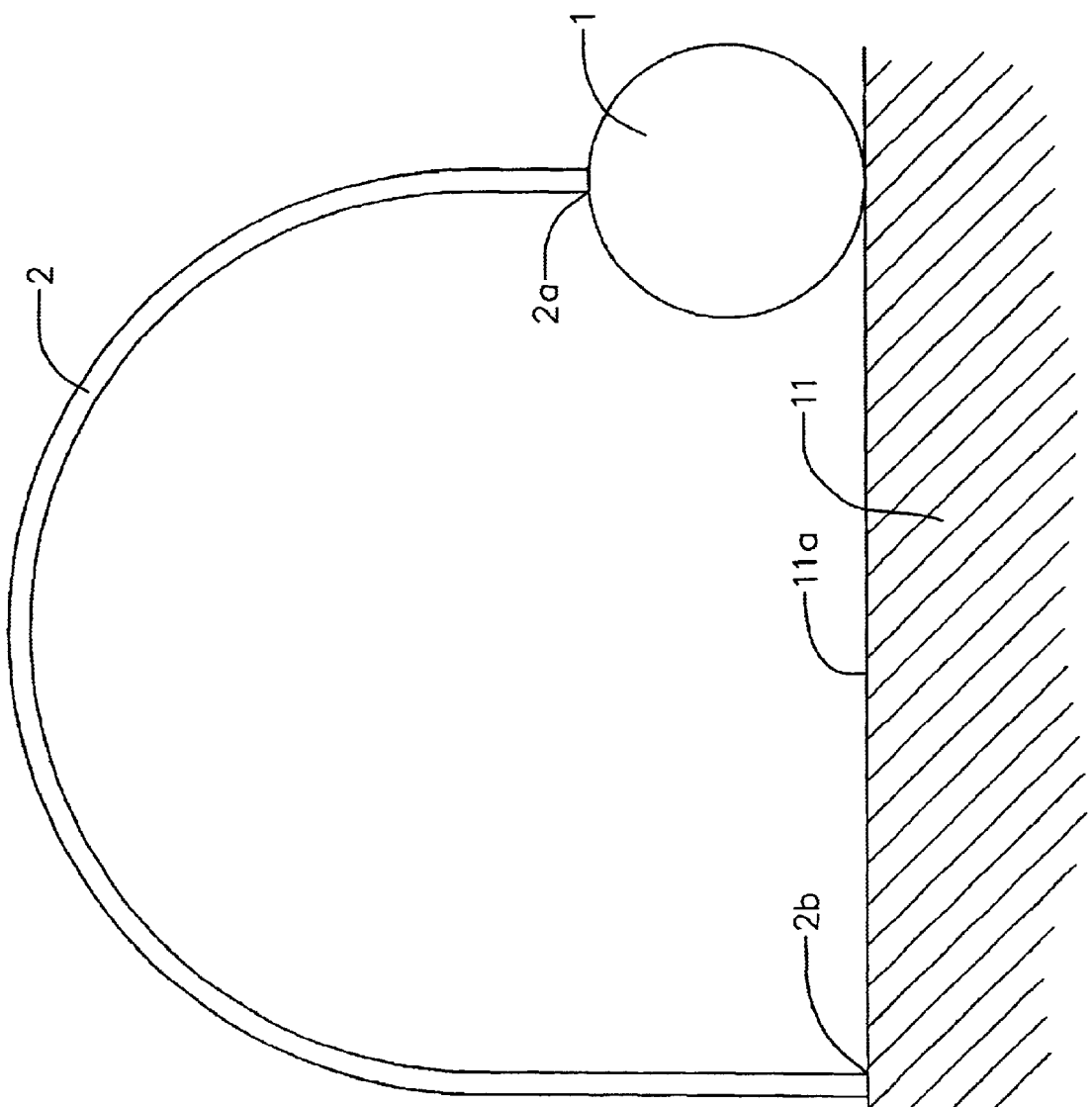
FIG. 1J is a side view of an embodiment of the cat toy of the present invention with a flexible attachment.

FIG. 1J illustrates another embodiment of a cat toy of the present invention. In this embodiment the member 2 is flexible. The length of member 2 is such that when the member extends from the top of the object and the object 1 is on the ground 11, the distal end 2b of the member 2 just contacts the surface of the ground 11a.

Figure 2:
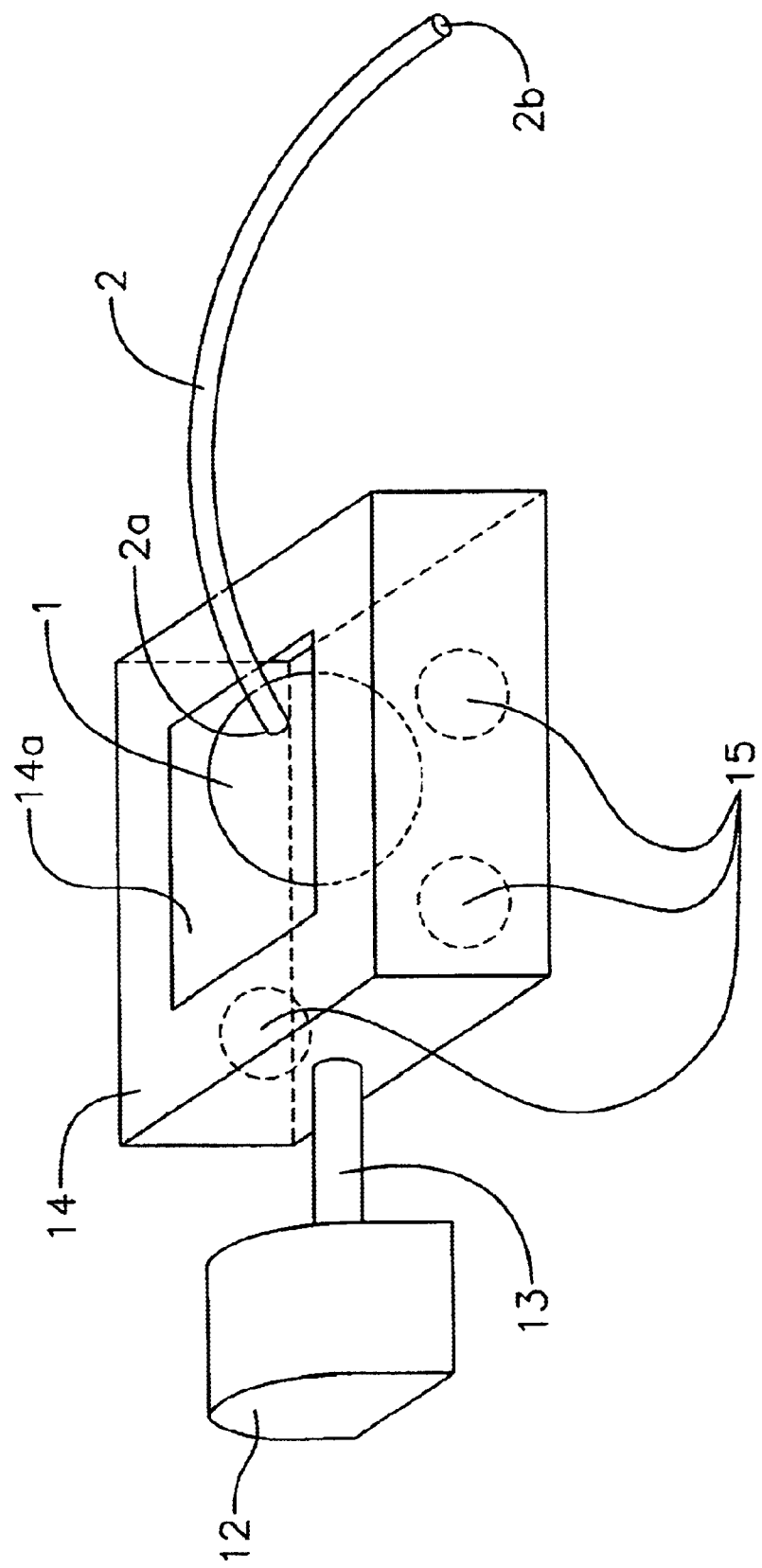
FIG. 2 is a perspective view of a cat toy of the present invention with externally generated random motion.

FIG. 2 illustrates a cat toy of the present invention with an external random motion generator. The cat toy is as described with respect to FIG. 1a, and has a body with an extending member. The body is partly contained within a box 14. The box has an open top 14a, and the member 2 is preferably of sufficient length to extend outside the volume defined by the box. A shaft 13 is connected to the box 14. A motor 12 drives the shaft 13 in a repetitive pattern. The shaft 13 translates the repetitive motion of a motor 12 into motion of the box 14. The body 1 moves randomly within the box due to its Brownian motion physical interactions with the surfaces of the box 14. The random motion of the body 1 is translated into motion of the member 2. The free end 2b of the member 2 thus moves randomly outside the enclosed volume defined by the box 14. The movement of the free end 2b of the member 2 is thus random and entices cats to play. Moreover, the movement of the cat toy as a whole is restricted so that the cat owner may be assured that the cat's play area is limited, thereby reducing the possibility that the cat or cat toy will not break objects in the home.

Optionally, additional spheres 15 may be placed in the box 14 to increase the amount of brownian motion of the object 1. The opening 14A of the box 14 should be small enough so that the object 1 or spheres 15 do not move out the box opening 14A.

Figure 3A:
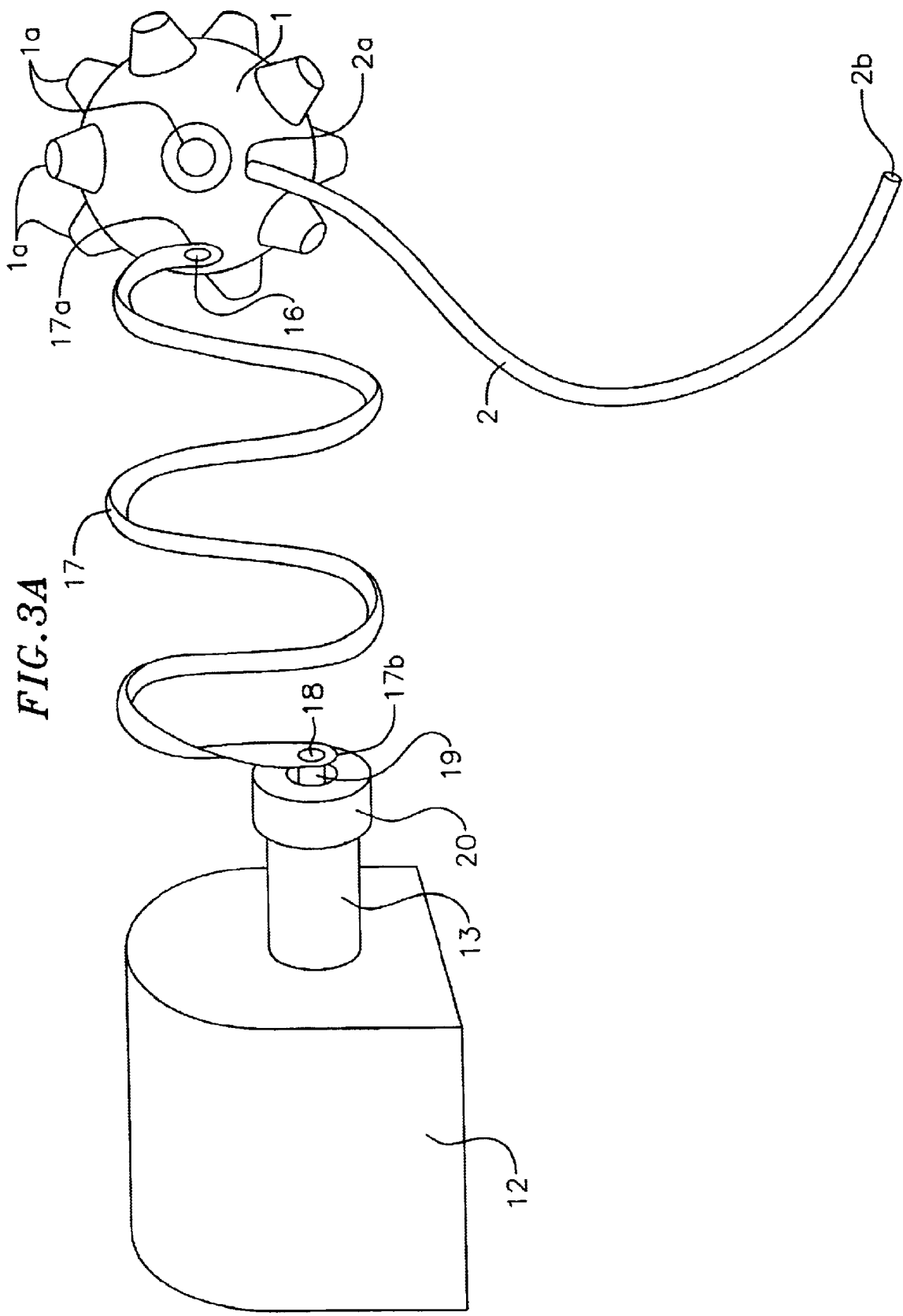
FIG. 3A is a perspective view of a cat toy of the present invention with externally generated random motion.

In the embodiment illustrated in FIG. 3A, a motor driven shaft 13 is connected to one end 17b of a spring 17. The other end 17a of the spring is coupled to the body 1 of the cat toy at a connection 16. The body 1 is induced to move through the motion of the spring 17 at the connection 17a. The motion of a body 1 is random due to bouncing of the body projections 1a off of the ground. The random motion of a body 1 is translated into the random motion of a member 2. The free end 2b of the member 2 thus moves randomly. The movement of the free end 2b of a member 2 is thus random and entices cats to play.

FIG. 3B is a detailed cross section view of the attachment of the spring 17 to the shaft 13 of FIG. 3A. The spring 17 is attached at one end 17b to a solid self-lubricating bearing 19 using a screw 18. The bearing 19 is held in place by a collar 20 having an internal flange 20a, and the end 13a of shaft 13. The collar 20 is attached to the shaft 13 with a set screw 21.

FIG. 4 is a detailed cross section view of the attachment of a member to an object. The object 1 is a hollow ball. A screw 221 extends outside of the surface of the object 1. The end 2a of a hollow member 2 is screwed onto the shaft of the screw 221. Optionally, the screw 221 is held in place with glue 22.

FIG. 7 illustrates a cross-sectional view of an attachment of a member to a body. The body includes an outer shell 31. An aperture in the outer shell 32 is adapted to receive a stud 33. The stud is shaped somewhat in the shape of a rivet, and includes a main portion and a squat cylindrical base 35 at on end. The end with the squat cylindrical base is inserted into the interior of the body. The main portion extends through the aperture and out of the body. As illustrated in FIG. 7, the main portion of the stud has a frustoconical shape. The frustoconical shape includes threads 37 along its outer edge.

Attached to the stud is a cap 39. The cap includes a top 43 and a flared hollow cylindrical portion extending from the top. The flared hollow cylindrical portion is adapted for mating to the frustoconical surface. The flared hollow cylindrical portion includes female threads 41 in the interior of the surface to increase adhesion to the frustoconical shape. The top of the cap includes an aperture 45. The aperture 45 is adapted for passage therethrough of a member 47. In one embodiment, the member is fixedly attached to the interior of the cap through the use of glue 49. In another embodiment, glue is not used to secure the member to the cap. Instead, an end of the member passed through the aperture in the cap is partially melted. Partially melting the end of the member results in deformation of the end, generally increasing the diameter of the end of the member. Accordingly, the end of the member is no longer able to pass through the aperture. In an additional embodiment, care is taken to assure that the end of the member does not melt and adhere to the cap. Instead the member is held in the cap merely through the increase in diameter in the end of the member caused by melting of the member. This allows the member to rotate freely within the cap, and thereby not cause the cap to potentially unscrew during play.

In addition, randomly moving bodies of the type previously described, particularly those with internally generated motion or those with directed motion such as illustrated in FIG. 3A, tend to rotate about an axis. Thus, items placed approximate a pole of rotation will generally move in a clockwise or counter clockwise fashion. Accordingly, in one embodiment the stud and cap attached to one pole use threads which tighten in a direction substantially opposite that of rotation of items about the pole. Thus, if the member is held fast, whether by human, cat, or an animate object during play, the member will tend to tighten due to the result of the movement of the body. Accordingly, inadvertent detachment of the member from the body is less likely to occur. In addition, for bodies which have identifiable equators, or zones of equators, defining angular movement of areas on the body, studs and caps on opposing sides of the equator are oppositely threaded.

The use of a separate cap and member, conveniently releasably attached to a stud on the body, allows for easy replacement of members. Replacement of the members may be due to damage to the members, such as through interaction during play by the cat, or as a way of replacing members the cat has grown tired of with members the cat may find more enjoyable. Thus, the use of the replaceable member allows for increased enjoyment of the toy by the cat, as well as allows the owner to avoid replacement of the body when such replacement is unnecessary.

FIG. 5A is a detailed cross section view of the external attachment of a counterweight 24 to the object 1. The counterweight 24 is made of a dense material, such as metal or a high-density plastic such as HDPE. The object 1 is hollow. A screw 23 extends in the object 1. The counterweight 24 is screwed onto the shaft of screw 23. Optionally, the screw 23 can be held in place with glue 22.

FIG. 5B is a detailed cross sectional view of the internal attachment of a counterweight 26 to the object 1. The counterweight 26 is made of a dense material such as metal or HDPE. The object 1 is hollow. A screw 25 extends into the object 1. The counterweight 26 is screwed onto the shaft of screw 25. Optionally counterweight 26 can be further held in place with glue 22.

Figure 6:
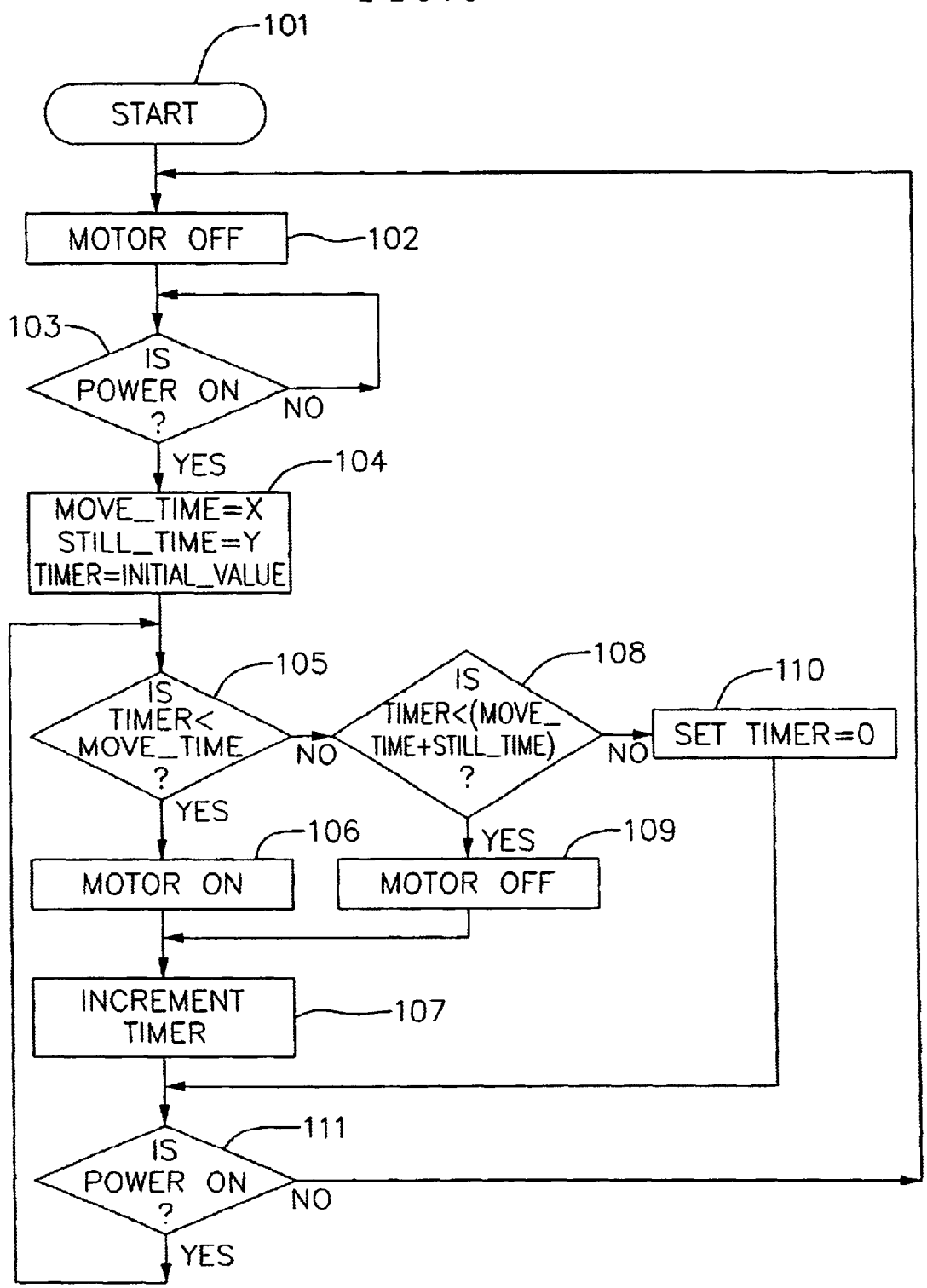
FIG. 6 illustrates a flow chart of a process to control generation of periodic motion of the cat toy of the present invention.

FIG. 6 illustrates a flow chart of a process for intermittently powering a motor to generate motion of the body of the present invention. Starting at step 101, the motor is set to off (step 102). A check is made to see if toy power is on (step 103). If the power is off, step 102 is repeated until the toy power is turned on. If the toy power is on, then the MOVE_TIME, STILL_TIME, and TIMER variables are initialized at step 104.

In step 104 the MOVE_TIME variable is set to the length of time in seconds that the motor will operate before switching to a still state. The STILL_TIME variable is set to the length of time the motor will be still before switching to a moving state. The TIMER is set to its initial value. The preferred value of the TIMER initial value is zero seconds. The results of using initial values other than zero for TIMER are described below.

In step 105 the value of TIMER is compared to MOVE_TIME. If TIMER is less than MOVE_TIME then in step 106 the motor is turned on if it was off, or remains on if it was already on. The TIMER is incremented in step 107.

If the value of TIMER in step 105 is equal to or greater than MOVE_TIME then in step 108 the value of TIMER is compared to the sum of MOVE_TIME plus STILL_TIME. If TIMER is less than that sum, then in step 109 the motor is turned off it was on or remains off it was already off. If in step 108 the value of TIMER is equal to or greater than the sum of MOVE_TIME plus STILL_TIME then in step 110 the value of TIMER is reset to zero.

In step 111 the toy power is checked. If the toy is still on then return to step 105. If the toy power is off then return to step 102 where the motor is turned off.

As can be determined from the flow chart and description of the flow chart above, if the initial value of TIMER is zero, or if the initial value of TIMER is greater than or equal to the sum of MOVE_TIME plus STILL_TIME, this results in the toy moving for a period of time equal to MOVE_TIME when it is turned on. If the initial value of TIMER is less than MOVE_TIME but greater than zero this results in the toy moving for a period of time shorter than MOVE_TIME when it is first turned on. If the initial value of timer is negative this results in the toy moving for a period of time longer than MOVE_TIME moving when it is turned on. If the initial value of TIMER is greater than or equal to MOVE_TIME, but less than the sum of MOVE_TIME plus STILL_TIME, this results in the toy being in a still state for a period of time shorter than or equal to STILL_TIME when the toy is turned on.

Operation of the above-described embodiments is straightforward. Place the device on a surface flat enough and hard enough so that it can move. Almost any flat surface such as wood, tile, cement, brick, or carpeted floor will work. Place the animal within sight of the member of the object. Turn on the power to the device. The animal will chase the end of the member. The owner can introduce the toy to the animal by placing the object within sight of the animal and leaving it for a few minutes to a few hours so that the animal becomes accustomed to the new object in their territory. In an alternate operation the owner introduces the toy to the animal by holding the object with the power off and letting the animal play with the member.

In an alternative embodiment the owner introduces the toy to the animal by holding the object with the power on and letting the animal play with the member.

The toy may be used for the entertainment, stimulus, and exercise of any other animal with natural curiosity or instinctive hunting skills such as dogs, ferrets, weasels, raccoons, or monkeys. The toy also may be used for the entertainment of children or adults.

Accordingly, the present invention provides self-propelled, randomly moving cat toys. Although this invention has been described in certain specific embodiments, many additional modifications and variations would be apparent to those skilled in the art. It is, therefore, to be understood that this invention may be practiced otherwise than as specifically described. Thus, the present embodiments of the invention should be considered in all respects as illustrative and not restrictive, the scope of the invention to be determined by the appended claims, the claims supported by this application, and their equivalents rather than the foregoing description.

What is claimed is:

1. A cat toy comprising:

a body;

motion means to propel the body in a series of varying direction; and an elongate member extending from the body with odor cues to attract the interest of an animal.

2. A cat toy comprising:

a body;

motion means to propel the body in a series of varying directions; and an elongate member extending from the body wherein the member is covered with scratchable rope, cloth, or fur.

3. A cat toy comprising:

a body:

a small motor within the body, the small motor moving a small weight also within the body, whereby movement of the small weight results in movement of the body in a series of varying directions; and an elongate member having a length at least twice the diameter of the body extending from the body;

wherein the member is capable of transmitting linear mechanical motion;

wherein the series of varying directions comprises pseudo-random movement; and wherein the member is releasably attached to the body by a stud and a cap, the stud being fixedly attached to the body and the cap being fixedly attached to the member, the cap and the stud being releasably attachable to one another.

4. A cat toy comprising:

a body;

motion means to propel the body in a series of varying directions; and an elongate member extending from the body wherein the member is releasably attached to the body by an attachment, the attachment comprising a stud extending from the body and a cap coupled to the stud, with the member coupled to the cap.

5. The cat toy of claim 4 wherein the cap is releasably coupled to the stud.

6. The cat toy of claim 5 wherein the cap includes a top, the top having an aperture.

7. The cat toy of claim 6 wherein the member includes an end passed through the aperture in the top of the cap.

8. The cat toy of claim 7 wherein the stud is threaded, and the cap includes an interior adapted to receive the threads of the stud.

9. The cat toy of claim 8 wherein the body has a general axis of rotation, and the stud is mounted approximate a pole of the axis of rotation.

10. The cat toy of claim 8 wherein the end of the member passed through the aperture includes a diameter greater than the diameter of the aperture.

* * * * *